US011651211B2

(12) United States Patent
Lai et al.

(10) Patent No.: US 11,651,211 B2
(45) Date of Patent: May 16, 2023

(54) TRAINING OF NEURAL NETWORK BASED NATURAL LANGUAGE PROCESSING MODELS USING DENSE KNOWLEDGE DISTILLATION

(71) Applicant: Adobe Inc., San Jose, CA (US)

(72) Inventors: Tuan Manh Lai, Lafayette, IN (US); Trung Huu Bui, San Jose, CA (US); Quan Hung Tran, San Jose, CA (US)

(73) Assignee: Adobe Inc., San Jose, CA (US)

( * ) Notice: Subject to any disclaimer, the term of this patent is extended or adjusted under 35 U.S.C. 154(b) by 724 days.

(21) Appl. No.: 16/717,698

(22) Filed: Dec. 17, 2019

(65) Prior Publication Data

US 2021/0182662 A1 Jun. 17, 2021

(51) Int. Cl.
*G06N 3/00* (2023.01)
*G06N 3/08* (2023.01)
*G06F 40/284* (2020.01)
*G06N 3/045* (2023.01)
*G10L 15/16* (2006.01)
*G10L 25/30* (2013.01)

(52) U.S. Cl.
CPC ............. *G06N 3/08* (2013.01); *G06F 40/284* (2020.01); *G06N 3/045* (2023.01); *G10L 15/16* (2013.01); *G10L 25/30* (2013.01)

(58) Field of Classification Search
CPC combination set(s) only.
See application file for complete search history.

(56) References Cited

PUBLICATIONS

Devlin, J. et al., "BERT: Pre-training of Deep Bidirectional Transformers for Language Understanding", arXiv:1810.0480522, May 24, 2019, 16 pages.
Cheong,R. and R. Daniel, "transformers.zip: Compressing Transformers with Pruning and Quantization", retrieved from semanticscholar.org, 2019, 13 pages.
"Paper dissected: "BERT: Pre-training of Deep Bidirectional Transformers for Language Understanding" Explained", retrieved from the internet: https://mlexplained.com/2019/01/07/paper-dissected-bert-pre-training-of-deep-bidirectional-transformers-for-language-understanding-explained/ [copy retrieved Sep. 27, 2019], 11 pages.
Ba, Lei Jimmy and Rich Caruana, "Do Deep Nets Really Need to be Deep?", arXiv:1312.6184v7, Oct. 11, 2014, 10 pages.
Hinton, G. et al., "Distilling the Knowledge in a Neural Network", arXiv:1503.02531v1, Mar. 9, 2015, 9 pages.

(Continued)

*Primary Examiner* — Vu B Hang
(74) *Attorney, Agent, or Firm* — Finch & Maloney PLLC

(57) ABSTRACT

Techniques for training a first neural network (NN) model using a pre-trained second NN model are disclosed. In an example, training data is input to the first and second models. The training data includes masked tokens and unmasked tokens. In response, the first model generates a first prediction associated with a masked token and a second prediction associated with an unmasked token, and the second model generates a third prediction associated with the masked token and a fourth prediction associated with the unmasked token. The first model is trained, based at least in part on the first, second, third, and fourth predictions. In another example, a prediction associated with a masked token, a prediction associated with an unmasked token, and a prediction associated with whether two sentences of training data are adjacent sentences are received from each of the first and second models. The first model is trained using the predictions.

20 Claims, 8 Drawing Sheets

(56) References Cited

PUBLICATIONS

Romero, A. et al., "Fitnets: Hints for Thin Deep Nets", arXiv:1412.65504v4, Mar. 27, 2015, 13 pages.

Sau, B.B. et al., "Deep Model Compression: Distilling Knowledge from Noisy Teachers", arXiv:1610.09650v2, Nov. 2, 2016, 9 pages.

Tang, R. et al., "Distilling Task-Specific Knowledge from BERT into Simple Neural Networks", arXiv:1903.12136v1, Mar. 28, 2019, 8 pages.

Training data 108a

"The boy is __ with his toy. He __ his toy very much."

FIG. 3A

Training data 108a

[START] [The] [boy] [is] [MASKED] [with] [his] [toy] [SEP] [He] [MASKED] [his] [toy] [very] [much] [SEP]

Special tokens · Masked tokens · Unmasked tokens

FIG. 3B

Training data 108b

"The boy is __ with his toy. Then the tiger __ away."

FIG. 3C

Training data 108b

[START] [The] [boy] [is] [MASKED] [with] [his] [toy] [SEP] [Then] [the] [tiger] [MASKED] [away] [SEP]

FIG. 3D

TRAINING OF NEURAL NETWORK BASED NATURAL LANGUAGE PROCESSING MODELS USING DENSE KNOWLEDGE DISTILLATION

FIELD OF THE DISCLOSURE

This disclosure relates generally to training neural network models, and more specifically to techniques for training neural network based Natural Language Processing (NLP) models.

BACKGROUND

With the introduction of the Neural Networks (NN), various models have been developed for a number of natural language processing (NLP) tasks. Many high-performance NN based NLP models have been introduced in the recent years, such as OpenAI GPT (generative pre-training), BERT (Bidirectional Encoder Representations from Transformers), and ELMo (Embeddings from Language Models). These models are used to achieve state-of-the-art results on a wide range of NLP tasks. Such new models for NLP tasks certainly can surpass previous models in performance and supposed insight, but only at the cost of increased computation cycles and storage space. For example, the base version of the BERT model can include 110 million parameters or more, each of which must be learned or otherwise sufficiently trained on, and can use 400 Megabytes (MB) of storage space. Accordingly, utilization of these existing models may not be practical in resource-limited systems, such as mobile devices (e.g., smartphones, navigation systems) or other such mainstream resource-limited computing platforms. To this end, there remains a number of non-trivial issues with respect to model compression methods suitable for NN architectures such as BERT. In a more general sense, there is a need for dense knowledge distillation methods in the context of NLP NN.

BRIEF DESCRIPTION OF THE DRAWINGS

FIGS. 3A, 3B, 3C, and 3D illustrate example sections of training data used to train the student model of FIGS. 1 and 2, in accordance with some embodiments of the present disclosure.

DETAILED DESCRIPTION

Figure 1:
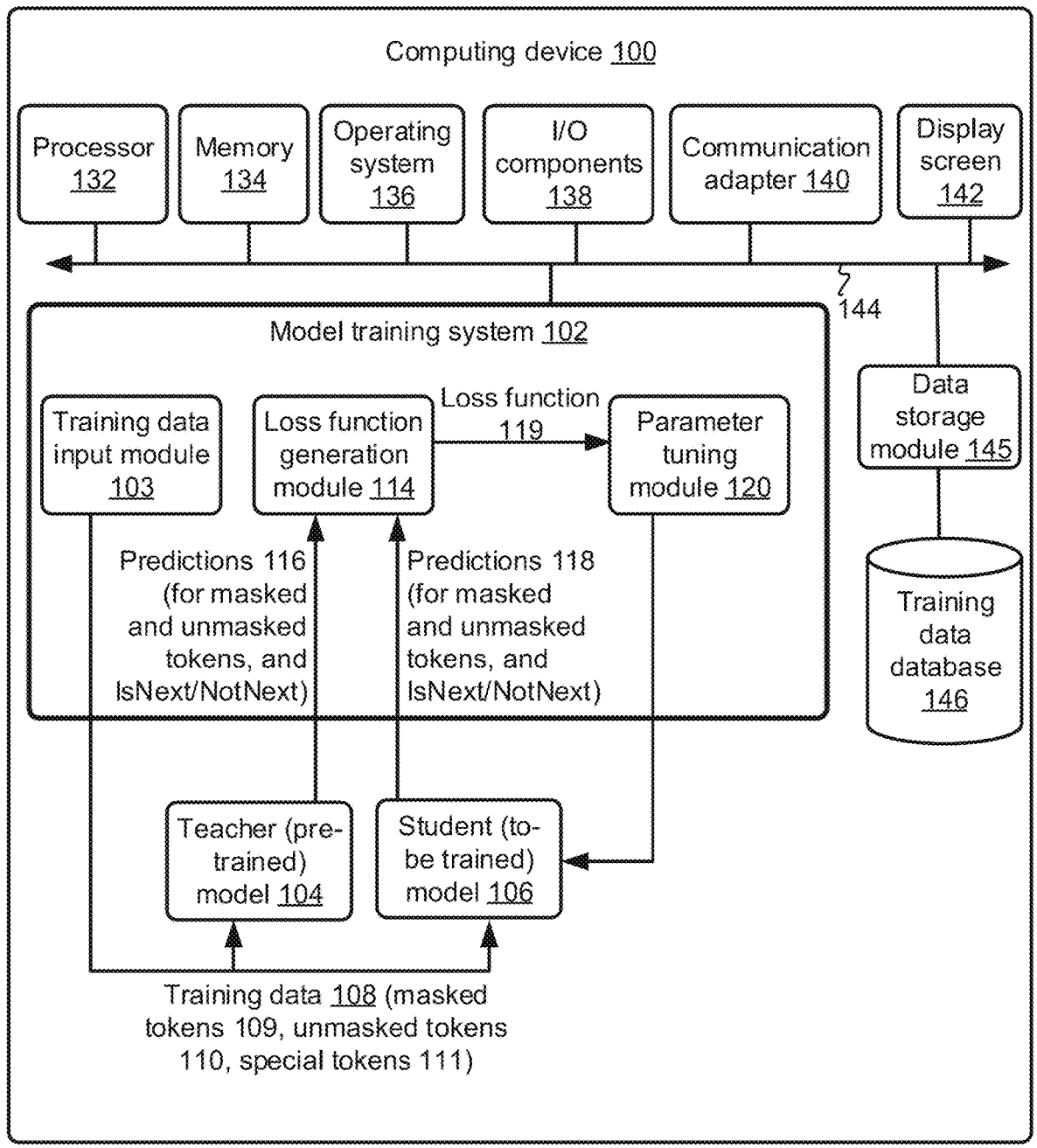
FIG. 1 is a block diagram schematically illustrating selected components of an example computing device configured to train a Neural Network (NN) based Natural Language Processing (NLP) student model, using a pre-trained NN based NLP teacher model, in accordance with some embodiments of the present disclosure.

Techniques are disclosed for training a reduced scale neural network based natural language processing (NLP) model using a full-scale NN based NLP model. The techniques are particularly well-suited for training transformer-based neural network models, such as BERT. In an embodiment, a dense knowledge distillation approach is used to train the reduced scale model. In this manner, the dense knowledge distillation can be used to effectively transfer knowledge acquired in the full-scale model to the reduced scale model. The full-scale model acts as a teacher model, and the reduced scale model acts as a student model. In more detail, and according to some such embodiments, training data used to train the student model comprises both masked tokens and unmasked tokens. A masked token comprises one or more words that are masked or hidden in the training data. Thus, the teacher and the student models have to predict the words corresponding to the masked token. An unmasked token includes one or more words that are explicitly mentioned in the training data. For purposes of training the student model, the teacher and the student models may be configured to predict the unmasked tokens as well (as if the tokens were masked tokens). So, for instance, the student model can be trained using a pre-trained teacher model as follows. Training data is input to both the student and teacher models. The training data includes a plurality of masked tokens and a plurality of unmasked tokens. The student model generates a first prediction and a second prediction, and the teacher model generates a third prediction and a fourth prediction. The first and third predictions are associated with a masked token of the training data, and the second and fourth predictions are associated with an unmasked token of the training data. The student model can then be trained based at least in part on the first, second, third, and fourth predictions. In some embodiments, the training of the student model uses loss functions associated with masked tokens of the training data, as well as loss functions associated with unmasked tokens of the training data. For instance, in an embodiment, a first loss function is generated based at least in part on a comparison of the first prediction and the third prediction (with respect to the masked token), and a second loss function is generated based at least in part on a comparison of the second prediction and the fourth prediction (with respect to the unmasked token). The student model is then trained based at least in part on the first and second loss functions.

General Overview

As previously explained, there exists a number of non-trivial issues associated with deploying full scale NN based NLP models in resource limited devices, such as mobile devices, particularly with respect to heavy computational burdens and higher storage requirements. For example, and in more detail, to address such computational burden and storage requirements, a number of model compression methods have been proposed, which can be categorized into the following four categories: weight pruning, weight quantization, lossless compression, and knowledge distillation. Techniques provided herein can generally be thought of as belonging to the knowledge distillation category, but provide superior results as will be explained in turn. In general, knowledge distillation effectively transfers knowledge acquired in one model (a teacher) to another model (a student) that is typically smaller. Knowledge distillation approaches typically can be expressed as a form of training the student model to mimic output activations of individual data examples represented by the teacher model. Previous work on knowledge distillation methods mostly focuses only on compressing traditional types of neural networks such as feedforward neural networks, recurrent neural networks, or convolutional neural networks. Limited work has been done to investigate knowledge distillation methods for architectures such as BERT, which involves transformer layers and thus is substantially different from traditional neural networks. One possible approach for a knowledge distillation method for BERT involves distilling task-specific knowledge from BERT into simple neural networks. However, this approach is not task-independent. In other words, whenever a new target down-stream task is presented, a new student model would need to be distilled from the original cumbersome BERT model. In addition, such an approach requires many heuristics to construct training examples for the distillation process.

Thus, techniques are provided herein that are task-independent and assume nothing about the target task. In an embodiment, a full-scale BERT teacher model is distilled into a smaller-scale general language representation model (also called a student model) only once. After that, the new smaller language representation model can be fine-tuned for new tasks. This significantly reduces the time needed to adapt the student model to a new task. Furthermore, note that such an embodiment avoids the need for many heuristics to construct training examples for the distillation process, and instead can use any large unlabeled text corpus (which can be readily collected from the Internet or other data source). Experimental results show that such an embodiment converges much faster than standard knowledge distillation methods. The resulting trained model can then be used in any number of applications, such as an intelligent assistant for a given application (e.g., Adobe Photoshop, searchable database of images, or any other application where an intelligent assistant may be helpful). Thus, the user can verbally query the assistant with natural language and receive appropriate answers, without being constrained to a rigid or otherwise fixed set of question-answer constructs.

Other benefits and advantages will be apparent in light of this disclosure. For example, such resource limited devices can have limited storage and/or limited computational power, and a full scale NN based NLP model may consume too much storage space and/or too much computational power to be effectively deployed in such resource limited devices. Accordingly, in some examples, a reduced scale NN based NLP model is trained using the full scale NN based NLP model, and the reduced scale NN based NLP model is deployed in such resource limited devices. For instance, the techniques provided herein can be used to achieve comparable results with the OpenAI GPT model, while using considerably fewer parameters and much less storage space (e.g., such as 8 times fewer parameters, and 16 times less storage space, according to an example embodiment). In addition, note that the techniques provided herein are by far superior to an approach that merely directly applies a standard knowledge distillation method to BERT, which would fail to distill any competitive model. Also, as previously explained, the approach is general and task-independent as it assumes nothing about the target down-stream task. Furthermore, the techniques do not need any labeled data. To this end, the knowledge distillation process is completely unsupervised, according to an embodiment.

As will be appreciated, the student model must be effectively trained in order to serve its purpose. In particular, after training of the student model as variously provided herein, the student model can be deployed to perform NLP tasks. For example, one use of the trained student model can be to predict one or more words of an input sentence. For example, assume that an audio recording device captures audio queries from a user, in which some words are not fully audible. An NLP task executed by the trained student model may be to predict such words. So, to properly train the student model for performing such an NLP task, the training data includes masked tokens, as discussed herein.

In more detail, and according to some embodiments, the training data comprises masked tokens, unmasked tokens, and special tokens. As will be discussed in further detail herein, a masked token comprises one or more words that are masked or hidden in the training data. Thus, the teacher and the student models have to predict the words corresponding to the masked token. For example, assume that the training data includes a sentence "The boy is _____ with his toy." Here, the blank space "_____" represents one or more words that are not explicitly mentioned in the training data, and may be a masked token. Each of the teacher and student models can predict one or more words that can possibly represent the masked token, such as "playing," "running," "sleeping," and so on for this example sentence. Merely as an example, the prediction can be in the form of a probability vector [p4a, p4b, p4c], where p4a represents a probability that the masked token is "playing," p4b represents a probability that the masked token is "running," and so on.

In some embodiments, the training data also includes unmasked tokens, which include words that are explicitly mentioned in the training data. For example, continuing with the above example where the training data includes the sentence "The boy is _____ with his toy", the unmasked tokens comprise the words "The," "boy," "is," "with," etc. Thus, the teacher and the student models know from the training data that the second token of the sentence is an unmasked token having the value of "boy." Generally, in regular operation of the models (e.g., when the teacher and/or the student models are deployed to perform NLP tasks), no prediction is needed for the unmasked tokens (as the model knows with certainty the value of this token). However, for purposes of training the student models, in some embodiments, the teacher and the student models are configured to predict the unmasked tokens as well, e.g., as if the tokens were actually masked tokens.

Thus, each of the teacher and the student models predict one or more words that can possibly represent an unmasked token. Continuing with the above example where the training data includes the sentence "The boy is _____ with his toy", for the second word of the sentence, the teacher and the student models can predict words such as "boy," "girl," "child," and so on. Merely as an example, the prediction can be in the form of a vector [p2a, p2b, p2c], where p2a represents a probability that the unmasked token is "boy," p2b represents a probability that the unmasked token is "girl," and so on.

In some embodiments, the training data also includes special tokens, such as tokens representing separation between sentences, start of training data, end of training data, and/or any other special token to represent any other appropriate special characteristics of the training data. Generally, no prediction is involved with the special tokens, and the special tokens may not be used for training, according to an embodiment.

Furthermore, some language models according to an embodiment, such as BERT, predict whether two sentences in a sentence pair of the training data are somewhat related and logically appear to be consecutive sentences, which is referred to as "IsNext/NotNext" prediction. For example, assume the training data includes two sentences as follows: "The boy _____ with his toy. He _____ his toy very much." The teacher and/or the student models may predict a high probability of the two sentences being logically related, and the second sentence to be a "next sentence" of the first sentence. Thus, one of the models may output a probability vector of, merely as an example, [0.95, 0.05], which implies a 95% chance of the second sentence to be a "next sentence" or "IsNext" of the first sentence, and a 5% chance of the second sentence to be a "not a next sentence" or "NotNext" of the first sentence.

In another example use case, assume the training data includes two sentences as follows: "The boy _____ with his toy. The election is to be _____ this November." The models may predict a high probability of the two sentences being logically unrelated, and the second sentence to be a "not next sentence" of the first sentence. Thus, a model may output a probability vector of, merely as an example, [0.1, 0.9], which implies a 10% chance of the second sentence to be a "next sentence" or "IsNext" of the first sentence, and a 90% chance of the second sentence to be a "not a next sentence" or "NotNext" of the first sentence.

Thus, and according to an embodiment, during a training phase of the student model, each of the student model and the teacher model outputs a number of predictions, including: (i) predictions for masked tokens, (ii) predictions for unmasked tokens, and (iii) IsNext/NotNext predictions. In some such embodiments, a model training system aims to tune parameters of the student model, such that the predictions output by the student model converge or substantially match with the predictions output by the teacher model.

Continuing with the above example where the training data includes the sentence "The boy is _____ with his toy", the actual labelled input to the teacher and student models will be [START] [The] [boy] [is] [MASKED] [with] [his] [toy] [SEP], where [START] and [SEP] are special tokens indicating start of training data and separation between two sentences, and the token [MASKED] is a masked token corresponding to the blank "_____" in the sentence. The other tokens are unmasked tokens.

Consider the third token, which is the unmasked token [boy], in the labelled training data. Both the teacher and student models can predict, merely as examples, "boy", "child", "man", and "girl" for this token. Assume that the teacher model provides a prediction in the form of a probability vector Pt3=[pt3_1, pt3_2, pt3_3, pt3_4], where pt3_1 corresponds to a probability that the token is "boy", where pt3_2 corresponds to a probability that the token is "child", and so on. Assume that the student model provides a prediction in the form of a probability vector Ps3=[ps3_1, ps3_2, ps3_3, ps3_4], where ps3_1 corresponds to a probability that the token is "boy", where ps3_2 corresponds to a probability that the token is "child", and so on. The model training system aims to train the student model, such that the probability vectors Ps3 and Pt3 substantially match (e.g., match beyond a threshold value).

For example, a loss function generation module of the model training system generates a loss function L3 that is based on a comparison of the above discussed probability vectors Ps3 and Pt3 generated by the student and teacher models, respectively. An example loss function is L3=H($\sigma$(t3/T), $\sigma$(s3/T)), where $\sigma$ is the softmax function, t3 is a logit of the probability vector Pt3, s3 is the logit of the probability vector Ps3, T is a temperature hyperparameter of the teacher and/or the student models, and the function H(.) is a cross-entropy function. The logit function and this example loss function equation is discussed herein later in further detail.

The loss function L3 corresponds to the unmasked token [boy], which is the third token in the example training data "[START] [The] [boy] [is] [MASKED] [with] [his] [toy] [SEP]." The loss function generation module similarly generates loss functions L2, L4, L5, L6, and so on. Note that the loss functions L2, L4, L6, L7, and so on are associated with unmasked tokens, while the loss function L5 is associated with a masked token.

Continuing with the above example, let the training data include an additional sentence, such that the training data is: "The boy is _____ with his toy. He _____ his toy very much." For the sentence pair, the teacher model provides a prediction in the form of a probability vector Pt0 comprising IsNext/NotNext prediction for the two sentences, and the student model provides a prediction in the form of a probability vector Ps0 comprising IsNext/NotNext prediction for the two sentences. In some embodiments, the loss function generation module generates loss function L0, based on comparing the probability vectors Pt0, Ps0, as discussed herein above.

Thus, now the model training system has multiple loss functions, such as L0, L2, L3, L4, L5, L6, and so on. Note that loss function L1 is omitted herein, as the first token is a special token [START] and there may not be any meaningful loss function L1. However, if a loss function L1 is generated for the special purpose token, such a loss function is also used during training.

In some embodiments, the model training system trains the student model, based on the loss functions L0, L2, L3, L4, L5, L6, and so on. For example, a parameter tuning module of the model training system tunes the parameters of the student module, to minimize or reduce individual ones of the loss functions and/or to minimize a Total Loss Function (TLF), which can be a summation of the individual loss functions. Thus, the parameter tuning module tunes the parameters of the student model, such that the student model mimics the behavior of the teacher model.

As the training progresses, the student model starts mimicking the teacher model and ultimately converges or otherwise becomes comparably trained with respect to the teacher model. For example, when the same training data is input to both the teacher and student models, the tuning of the parameters of the student model results in the output of the student model to becoming increasingly similar to the output of the teacher model. For example, an output of the teacher model for a specific set of training data tends to be close to, or similar to, a corresponding output of the pre-trained teacher model. For example, as the training progresses, individual ones of the loss functions L0, L2, L3, and so on decreases, and the total loss also decreases. After the student model is fully trained, ideally, the loss functions tend to zero, close to zero, or less than a threshold value (e.g., depending on how well trained the student model is).

Thus, in some embodiments, the student model is trained based on loss functions that are derived based on both masked and unmasked tokens, as well as IsNext/NotNext predictions. Training the student model using predictions associated with both masked and unmasked tokens, as well as IsNext/NotNext predictions, results in higher number of loss functions, which results in faster and better training of the student model. Put differently, the student model is trained using (i) predictions associated with masked tokens, (ii) predictions associated with unmasked tokens, and (iii) IsNext/NotNext predictions, which results in a relatively larger number of loss functions, according to an embodiment. Accordingly, such training is also referred to herein as "dense knowledge distillation (KD)" training, or simply as "dense KD" training.

In contrast, if the training of a student model relied merely on predictions associated with masked tokens and possibly also on IsNext/NotNext predictions (but not on predictions associated with unmasked tokens), such training has to rely on relatively fewer number of loss functions—and accordingly, such training is also referred to herein as "sparse knowledge distillation (KD)" training, or simply as "sparse KD" training.

As will be discussed herein in further details, the dense KD training discussed herein helps in relatively faster and better training of the student model, compared to the sparse KD training approach. For example, for the dense KD training approach discussed herein, the loss function decreases relatively faster toward convergence with the teacher model than that with the sparse KD training approach. Numerous variations and embodiments will be appreciated in light of this disclosure.

System Architecture and Example Operation

FIG. 1 is a block diagram schematically illustrating selected components of an example computing device 100 (also referred to as device 100) configured to train a NN based NLP student model 106, using a pre-trained NN based NLP teacher model 104, in accordance with some embodiments of the present disclosure. As can be seen, the device 100 includes a model training system 102 (also referred to as system 102) that allows the device 100 to train the model 106 using the pre-trained teacher model 104.

As will be appreciated, the configuration of the device 100 may vary from one embodiment to the next. To this end, the discussion herein will focus more on aspects of the device 100 that are related to training of the model 106, and less so on standard componentry and functionality typical of computing devices.

The device 100 can comprise, for example, an enterprise class server computer, a desktop computer, a laptop computer, a workstation, a handheld computer, a tablet computer, a smartphone, a set-top box, a game controller, and/or any other computing device that can train a NN based NLP model, using another pre-trained NN based NLP model.

In some embodiments, the models 104, 106 can perform various NLP tasks, such as predicting masked words in a sentence, whether two random sentences in a sentence pair are related, and/or any other appropriate NLP tasks, as will be discussed in detail herein. In some embodiments, the models 104, 106 can be any appropriate NN based NLP models, such as GPT (generative pre-training), OpenAI GPT-2, BERT (Bidirectional Encoder Representations from Transformers), ELMo (Embeddings from Language Models), bidirectional long short-term memory network (BiLSTM), and/or another appropriate language model. The models 104, 106 are also referred to herein NN based language models.

In some embodiments, the model 104 is a larger model relative to the model 106. For example, the model 104 has a higher number of transformer layers than a number of transformer layers in the model 106. In another example, a hidden size of individual transformer layer of the model 104 is larger than that of the model 106. Merely as an example, the hidden size of individual transformer layer of the model 104 may be four times larger than that of the model 106.

In yet another example, a number of tunable or trainable parameters in the model 104 is larger than a number of tunable or trainable parameters in the model 106. Merely as an example, the model 104 can have 110 million (M) parameters, where as the model 106 can have parameters in the range of about 5 M to about 27 M. Thus, in an example, the model 104 can have at least 2× (twice), 3×, or 4× more parameters than the model 106.

In some embodiments, an amount of storage space consumed by the model 104 is larger than an amount of storage space consumed by the model 106. Merely as an example, the model 104 can consume 440 MB storage space, whereas the model 104 can consume storage space in the range of about 22 MB to about 104 MB. Thus, the model 106 is a compressed and smaller model compared to the pre-trained model 104.

In an example, because of the relatively large size and/or computational complexity of the model 104, it may not be possible or ideal to deploy the model 104 in various resource-limited devices, such as mobile devices, smart phones, various consumer electronic devices, and/or any other resource-limited device that is to perform NLP tasks. However, because the model 106 is relatively small in size and/or relatively less complex, the model 106 can be deployed in such devices.

In some embodiments, the student model 106 is to be trained using the pre-trained model 104. For example, the system 102 distills knowledge from the pre-trained model 104, to train the smaller model 106. The larger pre-trained model 104 serves as a "teacher" model, and the smaller to-be-trained model 106 serves as a "student" model. The student model 106 learns, during the course of training, to mimic the teacher model 104. The model 106 is also referred to herein as a to-be-trained model, a to-be-trained student model, and/or a student model. The model 104 is also referred to herein as a pre-trained model, a pre-trained teacher model, and/or a teacher model.

The knowledge-distillation based training process is model agnostic. That is, the two models 104, 106 need not be of the same type, and the knowledge transfer or distillation from the teacher model 104 to the student model 106 is possible even if the two models 104, 106 are of different types. Thus, in an example, the model 104 can be a full-scale BERT and the model 106 can be a reduced scale BERT. In another example, the model 104 can be a full-scale BERT and the model 106 can be a reduced scale BiLSTM.

As will be discussed in further details herein, in some embodiments, the system 102 comprises a training data input module 103 that accesses training data 108, and inputs the same training data 108 to both the models 104, 106. In some embodiments, the training data 108 includes masked tokens 109, unmasked tokens 110, and special tokens 111. The training data can be sourced from any appropriate source that includes a plurality of sentences, including the Internet.

As discussed herein, a masked token comprises one or more words that are "masked" or hidden in the training data. Thus, the models 104, 106 have to predict the words corresponding to the masked token. For example, assume that the training data 108 includes a sentence "The boy is _____ with his toy." Here, the blank space "_____" represents one or more words that are not explicitly mentioned in the training data 108, and may be a masked token. Each of the models 104, 106 can predict one or more words that can possibly represent the masked token, such as "playing," "running," "sleeping," and so on. Merely as an example, the prediction can be in the form of a vector [p4a, p4b, p4c], where p4a represents a probability that the masked token is "playing," p4b represents a probability that the masked token is "running," and so on.

In some embodiments, the training data 108 also includes unmasked tokens, which include words that are explicitly mentioned in the training data. For example, continuing with the above example where the training data 108 includes a sentence "The boy _____ is with his toy", the unmasked tokens comprises the words "The," "boy," "with," etc. Thus, the models 104, 106 know from the training data 108 that the second token of the sentence is an unmasked token having the value of "boy." Generally, in regular operation of the models 104, 106 (e.g., when the models 104, 106 are deployed to perform NLP tasks), no prediction is needed for this unmasked token (as the model knows with certainty the value of this token). However, for purposes of training the models 104, 106, the models can be configured to predict this unmasked token as well, e.g., as if this token is also a masked token. Each of the models 104, 106 can predict one or more words that can possibly be the unmasked token, such as "boy," "girl," "child," and so on. Merely as an example, the prediction can be in the form of a vector [p2a, p2b, p2c], where p2a represents a probability that the unmasked token is "boy," p2b represents a probability that the unmasked token is "girl," and so on.

In some embodiments, the training data 108 also includes special tokens, such as tokens representing break between sentences, start of training data, end of training data, and/or any other special token to represent any other appropriate special characteristics of the training data 108. Generally, no prediction is involved with the special tokens.

Furthermore, some language models, such as BERT, predict whether two sentences in a sentence pair of the training data are somewhat related and logically appear to be consecutive sentences, which is referred to as "IsNext/NotNext" prediction. For example, assume the training data 108 includes two sentences as follows: "The boy _____ with his toy. He _____ his toy very much." The models 104, 106 may predict a high probability of the two sentences being logically related, and the second sentence to be a "next sentence" of the first sentence. Thus, the model 104 may output a probability vector of, merely as an example, [0.95, 0.05], which implies a 95% chance of the second sentence to be a "next sentence" or "IsNext" of the first sentence, and a 5% chance of the second sentence to be a "not a next sentence" or "NotNext" of the first sentence.

In another example, assume the training data 108 includes two sentences as follows: "The boy _____ with his toy. The election is to be _____ this November." The models 104, 106 may predict a high probability of the two sentences being logically unrelated, and the second sentence to be a "not next sentence" of the first sentence. Thus, the model 104 may output a probability vector of, merely as an example, [0.1, 0.9], which implies a 10% chance of the second sentence to be a "next sentence" or "IsNext" of the first sentence, and a 90% chance of the second sentence to be a "not a next sentence" or "NotNext" of the first sentence.

Thus, as illustrated in FIG. 1, in some embodiments, the pre-trained teacher model 104 outputs predictions 116, which include (i) predictions for masked tokens, (ii) predictions for unmasked tokens, and (iii) "IsNext/NotNext" predictions. The to-be-trained student model 106 similarly outputs predictions 118, which include (i) predictions for masked tokens, (ii) predictions for unmasked tokens, and (iii) "IsNext/NotNext" predictions. When the model 106 is not yet trained (or not yet adequately trained), the predictions 116, 118 would not match. With the progress in the training of the model 106, the predictions 116, 118 would gradually converge or start matching.

In some embodiments and as will be discussed in further detail herein, the system 102 comprises a loss function generation module 114, which generates a loss function 119. The loss function 119 is based on comparison of the predictions 116, 118. Thus, the loss function 119 is indicative of how well trained is the model 106. As and when the training of the model 106 progresses, the loss function 119 is likely to decrease, e.g., as the predictions 116, 118 gradually converge. Put differently, the training system 102 trains the model 106, with an aim to decrease the loss function 119.

In some embodiments and as will be discussed in further detail herein, the system 102 comprises a parameter tuning module 120, which receives the loss function 119, and uses the loss function 119 to tune parameters of the model 106 as a part of the training process. The parameter tuning module 120 tunes the parameters of the model 106 with a goal to eventually substantially match or bring the predictions 118 to be closer to the predictions 116, which decreases the loss function 119. Once the predictions 118 and 116 matches or are sufficiently close (e.g., difference between the two predictions is less than a threshold value, and the loss function 119 is less than a threshold value), the model 106 is assumed to be fully trained.

In the illustrated embodiment, the device 100 includes one or more software modules configured to implement certain functionalities disclosed herein, as well as hardware configured to enable such implementation. These hardware and software components may include, among other things, a processor 132, memory 134, an operating system 136, input/output (I/O) components 138, a communication adaptor 140, data storage module 145, the model training system 102, and the models 104, 106. A training data database 146 (e.g., that comprises a non-transitory computer memory) stores the training data 108, and is coupled to the data storage module 145. A bus and/or interconnect 144 is also provided to allow for inter- and intra-device communications using, for example, communication adaptor 140. Note that in an example, components like the operating system 136, the model training system 102, and the models 104, 106 can be software modules that are stored in memory 134 and executable by the processor 132. In an example, at least sections of the model training system 102 and/or the models 104, 106 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually take place over a physical bus structure or via software calls, request/response constructs, or any other such inter and intra component interface technologies, as will be appreciated.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also includes one or more I/O components 138, such as one or more of a tactile keyboard, a display, a mouse, a touch sensitive display, a touch-screen display, a trackpad, a microphone, a camera, scanner, and location services.

In some embodiments, the device 100 includes, or is communicatively coupled to, a display screen 142. Thus, in an example, the display screen 142 can be a part of the device 100, while in another example the display screen 142 can be external to the device 100.

In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the system 102 may be implemented in any application that allows digital content processing and displaying.

Figure 2:
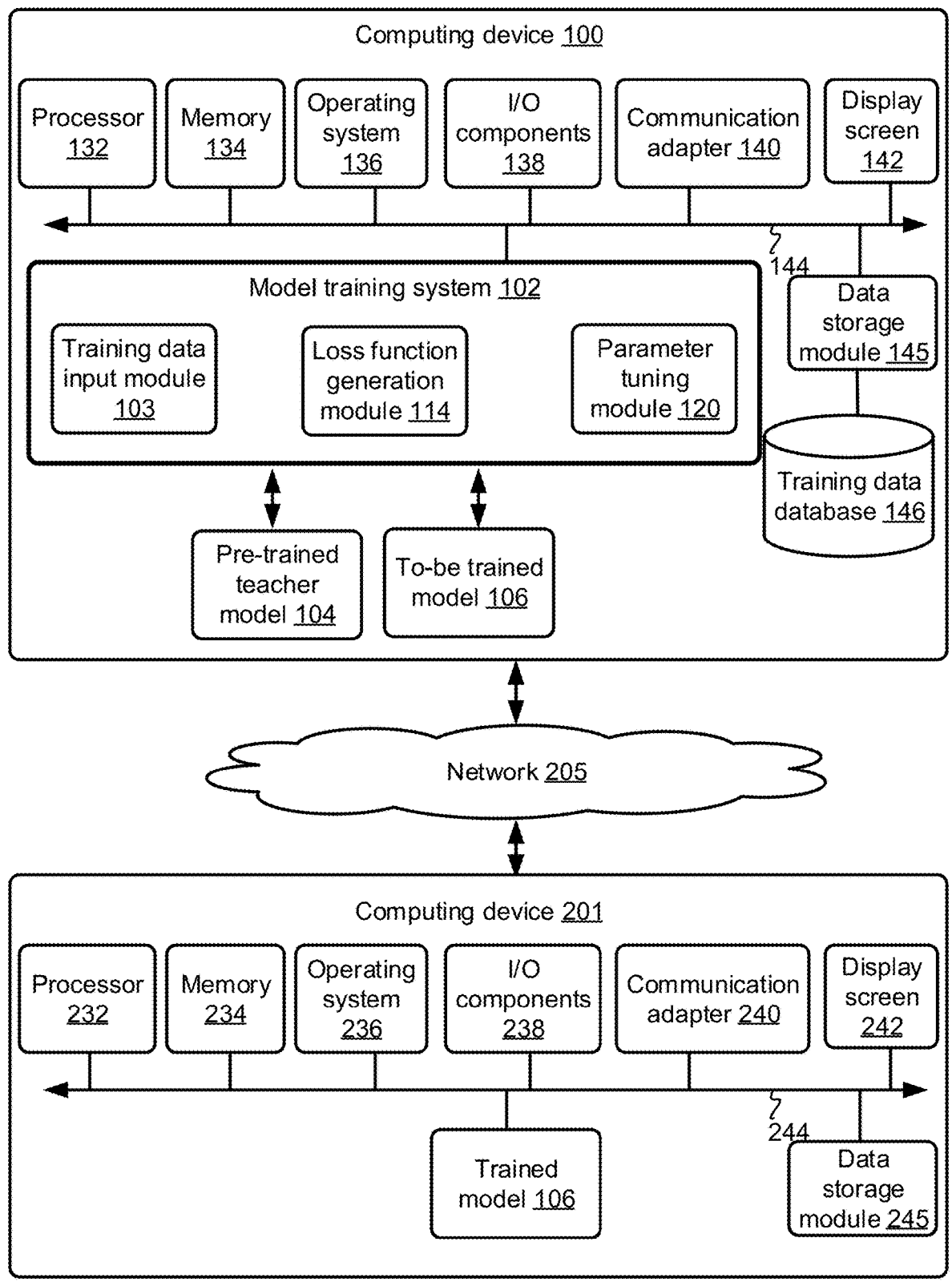
FIG. 2 is a block diagram schematically illustrating selected components of an example system comprising a first computing device of FIG. 1 communicating with a second computing device, wherein the student model trained by the first computing device is deployed in the second computing device to perform one or more appropriate NLP tasks, in accordance with some embodiments of the present disclosure.

FIG. 2 is a block diagram schematically illustrating selected components of an example system 200 comprising a first computing device 100 of FIG. 1 communicating with a second computing device 201, wherein the model 106 trained by the first computing device 100 is deployed in the second computing device 201 to perform one or more appropriate NLP tasks, in accordance with some embodiments of the present disclosure.

The device 201 can comprise, for example, a desktop computer, a laptop computer, a workstation, a handheld computer, a tablet computer, a smartphone, a set-top box, a game controller, and/or any other computing device that stores a NN based NLP model for performing one or more NLP tasks. In an example, the device 201 can be resource limited, such that the full-scale model 104 cannot be easily deployed in the device 201, but the reduced scale model 106 can be deployed in the device 201.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the computing device 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In the illustrated embodiment, the device 201 includes one or more software modules configured to implement certain functionalities disclosed herein, as well as hardware configured to enable such implementation. These hardware and software components may include, among other things, a processor 232, memory 234, an operating system 236, input/output (I/O) components 238, a communication adaptor 240, data storage module 245, and the trained model 106 (e.g., as trained by the system 102 of the computing device 100). A bus and/or interconnect 244 is also provided to allow for inter- and intra-device communications using, for example, communication adaptor 240. Note that in an example, components like the operating system 236 and the model 106 can be software modules that are stored in memory 234 and executable by the processor 232. In an example, at least sections of the model 106 can be implemented at least in part by hardware, such as by Application-Specific Integrated Circuit (ASIC) or microcontroller with one or more embedded routines. The previous relevant discussion with respect to the symbolic nature of bus and/or interconnect 144 is equally applicable here to bus and/or interconnect 244, as will be appreciated.

Processor 232 can be implemented using any suitable processor, and may include one or more coprocessors or controllers, such as an audio processor or a graphics processing unit, to assist in processing operations of the device 201. Likewise, memory 234 can be implemented using any suitable type of digital storage, such as one or more of a disk drive, solid state drive, a universal serial bus (USB) drive, flash memory, random access memory (RAM), or any suitable combination of the foregoing. Operating system 236 may comprise any suitable operating system, such as Google Android, Microsoft Windows, or Apple OS X. As will be appreciated in light of this disclosure, the techniques provided herein can be implemented without regard to the particular operating system provided in conjunction with device 201, and therefore may also be implemented using any suitable existing or subsequently-developed platform. Communication adaptor 240 can be implemented using any appropriate network chip or chipset which allows for wired or wireless connection to a network and/or other computing devices and/or resource. The device 201 also includes one or more I/O components 238, such as one or more of a tactile keyboard, a display, a mouse, a touch sensitive display, a touch-screen display, a trackpad, a microphone, a camera, scanner, and location services. In some embodiments, the device 200 includes, or is communicatively coupled to, a display screen 242. Thus, in an example, the display screen 242 can be a part of the device 201, while in another example the display screen 242 can be external to the device 201. In general, other standard componentry and functionality not reflected in the schematic block diagram of FIG. 2 will be readily apparent, and it will be further appreciated that the present disclosure is not intended to be limited to any specific hardware configuration. Thus, other configurations and subcomponents can be used in other embodiments.

In an example, the model 106 performing one or more NLP tasks may be implemented as part of a stand-alone application, as a module of an application, as a plug-in for applications, as a library function or functions that may be called by other applications, and/or as a cloud-computing model. Thus, the components of the model 106 may be implemented as part of a stand-alone application on a personal computing device or a mobile device. Alternatively, or additionally, the components of the model 106 may be implemented in any application that allows digital content processing and displaying.

FIGS. 3A, 3B, 3C, and 3D illustrate example sections of training data 108 used to train the model 106 of FIGS. 1 and 2, in accordance with some embodiments of the present disclosure. For example, example training data 108a illustrated in FIGS. 3A-3B and example training data 108b illustrated in FIGS. 3C-3D can be part of the training data 108 of FIGS. 1, 2. Note that the training data 108 can include thousands, or even millions of sentences. However, merely two example sentences of the training data 108 are illustrated in each of FIGS. 3A-3D. The training data in FIGS. 3A, 3C are in unlabeled format, while the training data 108 in FIGS. 3B, 3D have been labelled to show various tokens within the training data 108.

The underlined blank spaces "_____" in FIGS. 3A, 3C represent masked tokens. As discussed herein, a masked token comprises one or more words in the training data that are masked or hidden from the models 104, 106. Thus, the models 104, 106 have to predict the words corresponding to the masked token. The masked tokens are labelled as [MASKED] in FIGS. 3B, 3D.

The training data 108a, 108b also include unmasked tokens, which include words that are explicitly mentioned in the training data 108a, 108b. For example, the words "The," "boy," and so on in FIGS. 3A-3B are unmasked tokens, that are provided to the models 104, 106. Similarly, for example, the words "Then," "tiger," and so on in FIGS. 3C-3D are unmasked tokens, that are provided to the models 104, 106. In some embodiments, the models 104, 106 aim to predict the masked tokens based on the unmasked tokens, as well as aim to predict the unmasked tokens.

In some embodiments, the training data 108a, 108b also includes special tokens, such as tokens representing start of training data (e.g., represented by token [START] in FIGS. 3B, 3D), break or separation between two sentences (e.g., represented by token [SEP] in FIGS. 3B, 3D), and/or any other special token to represent any other appropriate special characteristics of the training data 108. Generally, no prediction is involved with the special tokens.

In addition to predicting various masked tokens, the models 104, 106 also aim to predict if two sentences in a pair of sentences in the data are logically connected, and whether one sentence follows another sentence. For example, given a pair of input sentence in the training data 108, the models 104, 106 output a "IsNext" or "NotNext" prediction, where "IsNext" output indicates a probability that the pair of sentences are likely adjacent sentences, and where "NotNext" output indicates a probability that the pair of sentences are logically not adjacent. For example, some language models, such as BERT, predict whether two sentences of the input data are somewhat related and logically appear to be consecutive sentences, which is referred to as "IsNext/NotNext" prediction.

For example, the training data 108a of FIGS. 3A-3B includes two sentences as follows: "The boy is _____ with his toy. He _____ his toy very much." The models 104, 106 may predict a high probability of the two sentences being logically related, and the second sentence to be a "next sentence" of the first sentence. Thus, the model 104 may output a probability vector of, merely as an example, [0.95, 0.05], which implies a 95% chance of the second sentence to be a "next sentence" or "IsNext" of the first sentence, and a 5% chance of the second sentence to be a "not a next sentence" or "NotNext" of the first sentence.

In another example, assume the training data 108b of FIGS. 3C-3D includes two sentences as follows: "The boy is _____ with his toy. Then the tiger _____ away." The models 104, 106 may predict a high probability of the two sentences being logically unrelated, and the second sentence to be a "not next sentence" of the first sentence. Thus, the model 104 may output a probability vector of, merely as an example, [0.1, 0.9], which implies a 10% chance of the second sentence to be a "next sentence" or "IsNext" of the first sentence, and a 90% chance of the second sentence to be a "not a next sentence" or "NotNext" of the first sentence.

Thus, as illustrated in FIG. 1, in some embodiments, the pre-trained teacher model 104 outputs predictions 116 for masked tokens and unmasked tokens, and the "IsNext/NotNext" predictions. Similarly, the student model 106 outputs predictions 118 for masked tokens and unmasked tokens, and the "IsNext/NotNext" predictions. When the student model 106 is not yet trained (or not yet adequately trained), the predictions 116, 118 would not match. With the progress in the training of the model 106, the predictions 116, 118 would gradually converge or start matching.

Figure 4A:
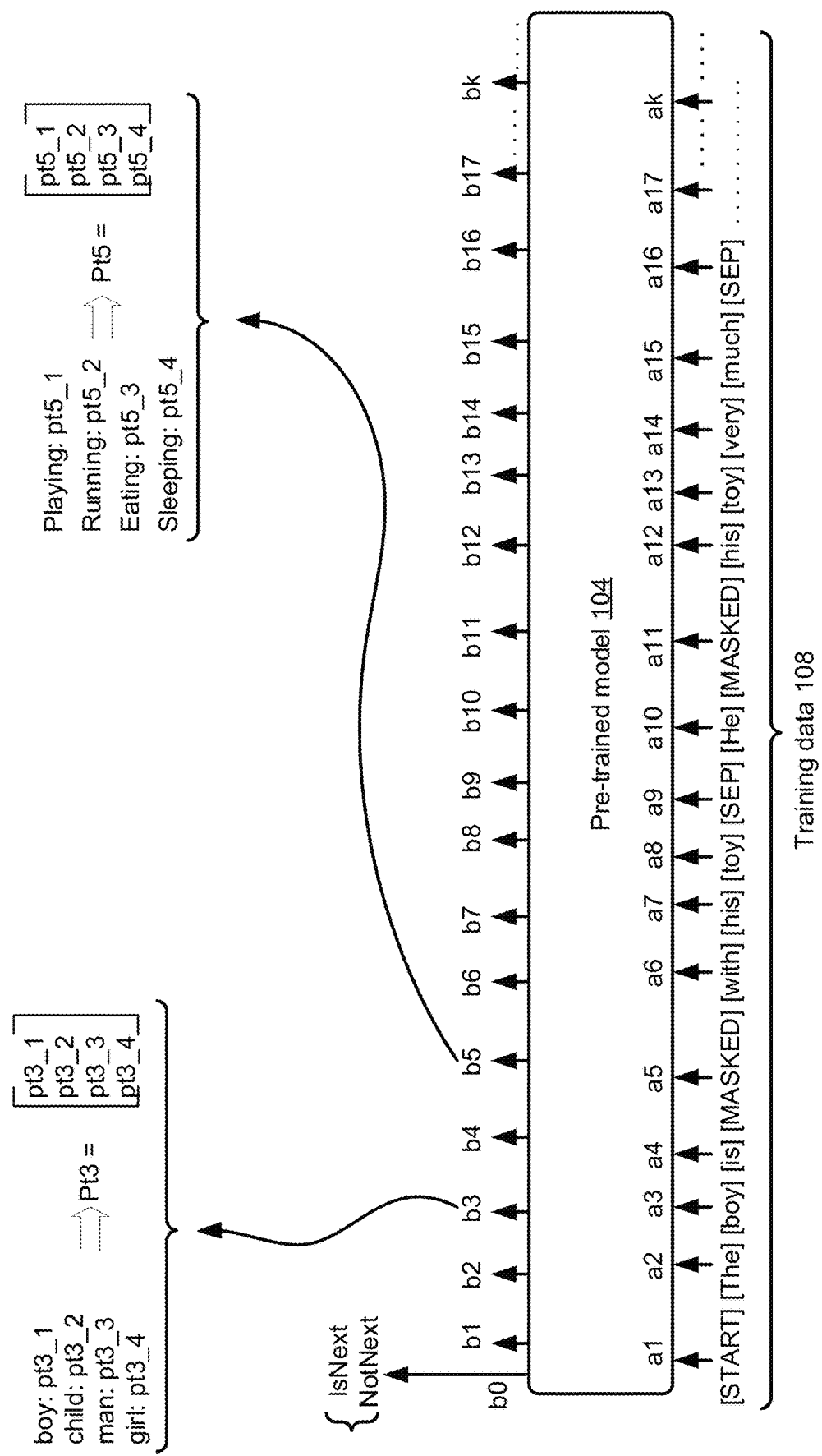
FIGS. 4A, 4B illustrate example operation of the teacher model and the student model, respectively, of FIGS. 1 and 2, during a training phase of the student model, in accordance with some embodiments of the present disclosure.
Figure 4B:
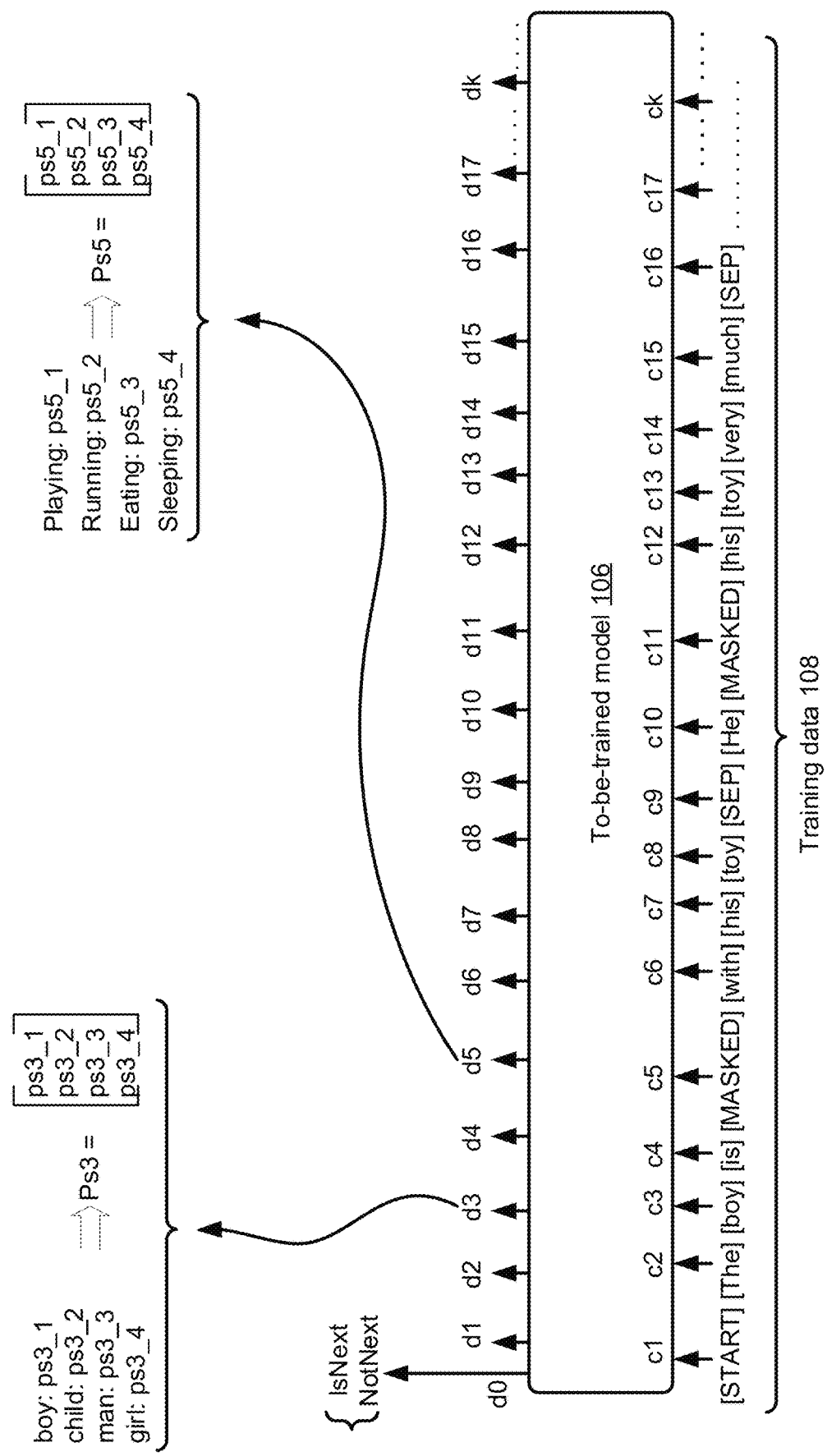

FIGS. 4A, 4B illustrate example operation of the teacher model 104 and the student model 106, respectively, of FIGS. 1 and 2, during a training phase of the student model 106, in accordance with some embodiments of the present disclosure.

Referring to FIG. 4A, the model 104 has a plurality of inputs a1, a2, . . . , ak, and so on, generally referred to as input "ak" of the model 104. In an example, the inputs of the model 104 sequentially (or parallelly) receive various tokens of the labelled training data 108. The example training data 108 illustrated in FIG. 4A corresponds to the training data 108a of FIGS. 3A, 3B. For example, FIG. 4A illustrates the input a1 receiving the special token [START] of the training data 108, the input a2 receiving the unmasked token [The] of the training data 108, the input a5 receiving the masked token [MASKED] of the training data 108, and so on.

The model 104 generates outputs b1, b2, . . . , bk, and so on, where each of the outputs b1, bk is associated with a corresponding one of the inputs a1, a2, . . . , ak. For example, output b1 is associated with input a1, output b2 is associated with input a2, and so on.

For masked and unmasked tokens, an output provides a prediction of a corresponding input. For example, input a5 is a masked token of the sentence "The boy is _____ with his toy." The corresponding output b5 provides a prediction of one or more words that can possibly replace the blank "_____" in this sentence. For example, in the example of FIG. 4A, the pre-trained teacher model 104 generates some predictions, such as "playing," "running," "eating," and "sleeping" for the input a5 comprising the masked token. The model 104 also outputs a probability pt5_1 that the masked token is "playing," a probability pt5_2 that the masked token is "running," a probability pt5_3 that the masked token is "eating," and a probability pt5_4 that the masked token is "sleeping." In an example, a sum of pt5_1, pt5_2, pt5_3, and pt5_4 is 1 (e.g., assuming that there are four outputs). Thus, the output b5 includes a probability vector Pt5=[pt5_1, pt5_2, pt5_3, pt5_4]. Merely as an example, the probability vector Pt5 can have a value of [0.5, 0.2, 0.2, 0.1].

As discussed, the word, which is represented by a masked token, is unknown to the model 104, and the model 104 aims to predict the word of the masked token. On the other hand, the words corresponding to the unmasked tokens are known to the model. For example, the model 104 knows that the input a3 is an unmasked token representing the word "boy." So, normally (e.g., during a regular operation of the model 104, while the model is deployed to perform NLP tasks), the model 104 need not predict the unmasked token. However, in some embodiments, for purposes of training the model 106, the model 104 predicts the unmasked tokens as well.

For example, after the model 104 has predicted the masked tokens, the model 104 considers individual unmasked tokens, assumes that the unmasked tokens are masked, and aims to predict those unmasked tokens. For example, the input a3 corresponds to the unmasked token [boy]. In some embodiments, after the model 104 has predicted the masked tokens, the model 104 predicts various words for the unmasked token of the input a3, such as, merely as examples, "boy", "child", "man", "girl", as illustrated in FIG. 4A. The model 104 also generates an output b3 in the form of a probability vector Pt3=[pt3_1, pt3_2, pt3_3, pt3_4], where pt3_1 corresponds to a probability that the input a3 is boy, where pt3_2 corresponds to a probability that the input a3 is child, and so on.

Thus, not only does the model 104 predict the masked token, the model 104 also predicts one or more unmasked tokens as well. In an example, the model 104 predicts at least a threshold percentage of unmasked tokens, where the threshold percentage may be 50%, 60%, 70%, 80%, 90%, or higher. For example, if there are "U" number of unmasked tokens in the training data 108, the model 104 predicts at least the threshold percentage of U of unmasked tokens. In another example, the model 104 predicts all the unmasked tokens.

Predicting at least some of the unmasked tokens, in addition to predicting the masked tokens, results in a higher number of probability vectors for a smaller training data set. For example, if merely masked tokens were to be predicted, the model 104 would generate merely 2 probability vectors (e.g., Pt5 and Pt11) corresponding to the two masked inputs a5 and a11 in the example training data 108 of FIG. 4A. However, as both masked and unmasked tokens are predicted, the model 104 generates a larger number of probability vectors, such as Pt2, Pt3, Pt4, Pt5, and so on, for the same example training data 108 of FIG. 4A. As discussed herein, such large and dense set of probability vectors results in faster and better training of the model 106, for the given training data 108.

In some embodiments, the model 104 also generates an output b0, which is a probability vector providing a prediction of IsNext and a prediction of NotNext, as previously discussed herein.

Referring now to FIG. 4B, the to-be-trained student model 106 has a plurality of inputs c1, c2, . . . , ck, and so on, generally referred to as input "ck" of the model 106. In an example, the inputs of the model 106 sequentially (or parallelly) receive various tokens of the training data 108. The example training data 108 of FIG. 4B corresponds to the training data 108a of FIGS. 3A, 3B, as discussed with respect to FIG. 4A.

The model 106 generates outputs d1, d2, . . . , dk, and so on, where each of the outputs d1, . . . , dk is associated with a corresponding one of the inputs c1, c2, . . . , ck, e.g., similar to the model 104 of FIG. 4A.

For the masked tokens and for at least some of the unmasked tokens, an output of the model 106 provides a prediction of a corresponding input, similar to the operation of the model 104. For example, input c5 is a masked token of the sentence "The boy is _____ with his toy." The corresponding output d5 provides a prediction of one or more words that can possibly replace the "_____" in this sentence. In the example of FIG. 4B, the student model 106 generates some predictions, such as "playing," "running," "eating," and sleeping" for the input c5 comprising the masked token. The model 106 also outputs a probability ps5_1 that the masked token is "playing," a probability ps5_2 that the masked token is "running," and so on. The output d5 includes a probability vector Ps5=[ps5_1, ps5_2, ps5_3, ps5_4], similar to the output of the model 104 of FIG. 4A.

In some embodiments, after the model 106 has predicted the masked tokens, the model 106 considers individual unmasked tokens, assumes that the unmasked tokens are masked, and aims to predict the unmasked tokens, similar to the operation of the model 104 discussed with respect to FIG. 4A. For example, the input c3 corresponds to the unmasked token [boy]. In some embodiments, after the model 106 has predicted the masked tokens, the model 106 predicts various words, such as boy, child, man, girl, as illustrated in FIG. 4B, which can be used for the unmasked input c3. The model 106 also generates an output d3 in the form of a probability vector Ps3=[ps3_1, ps3_2, ps3_3, ps3_4], where ps3_1 corresponds to a probability that the input c3 is boy, and so on.

Thus, not only does the model 106 predict the masked token, the model 106 also predicts one or more unmasked tokens as well. In an example, the model 106 predicts more than a threshold percentage of unmasked tokens, where the threshold percentage may be 50%, 60%, 70%, 80%, 90%, or higher, as also discussed with respect to FIG. 4A. In another example, the model 106 predicts all the unmasked tokens.

In some embodiments, the model 106 also generates an output d0, which is a probability vector providing a prediction of IsNext and a prediction of NotNext, as previously discussed herein.

Figure 5:
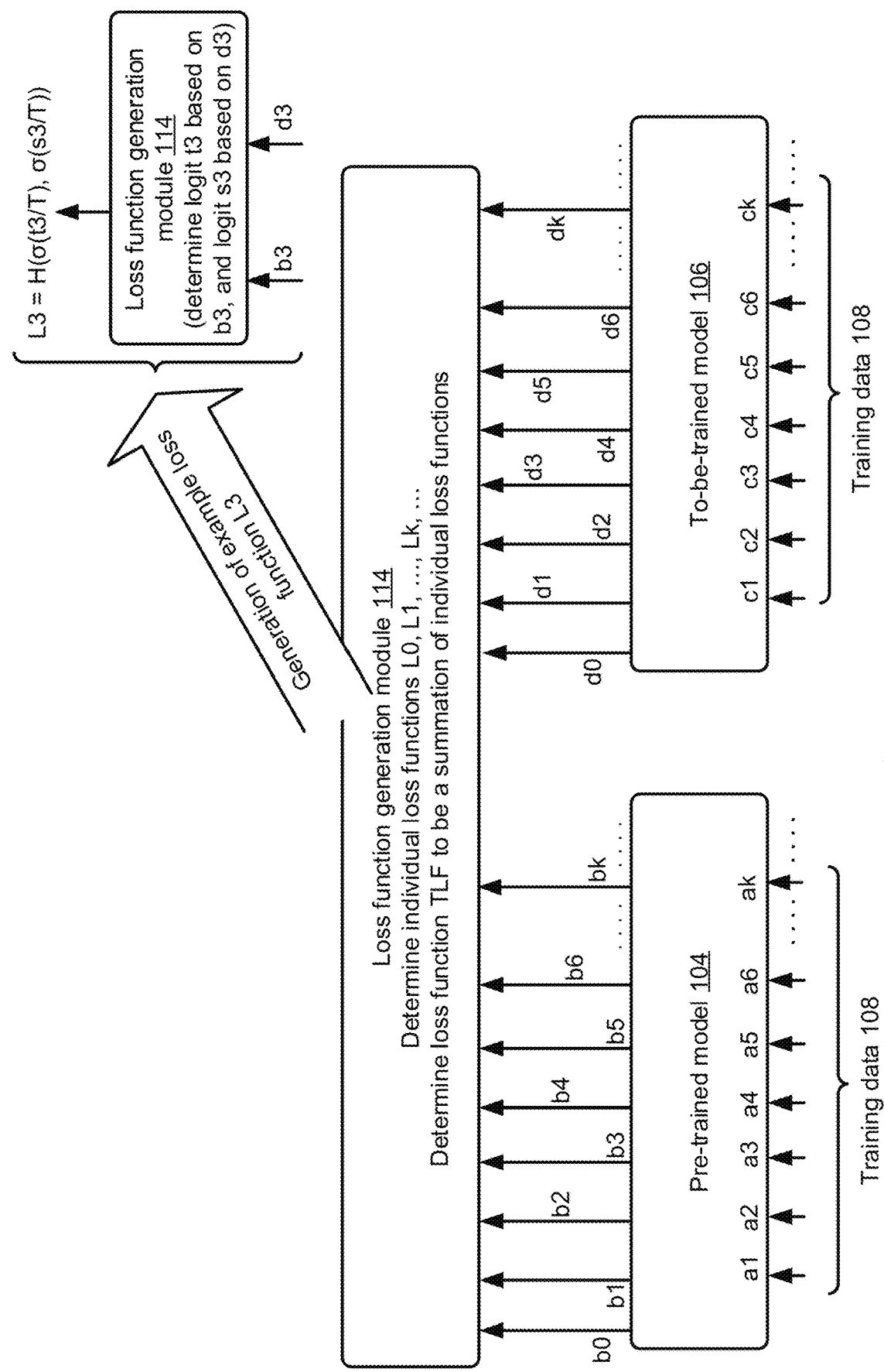
FIG. 5 illustrates example operation of a loss function generation module while the student model is being trained, in accordance with some embodiments of the present disclosure.

FIG. 5 illustrates example operation of the loss function generation module 114 while the model 106 is being trained, in accordance with some embodiments of the present disclosure. As discussed with respect to FIGS. 4A, 4B and as also illustrated in FIG. 5, both the models 104, 106 receive the same training data 108. Merely as an example and discussed with respect to FIGS. 4A, 4B, both the input a3 and the input c3 of the models 104, 104, respectively, is "boy." Merely as an example and discussed with respect to FIG. 4A, the output b3 of the model 104 is a probability vector Pt3=[pt3_1, pt3_2, pt3_3, pt3_4], where pt3_1, pt3_2, pt3_3, pt3_4 respectively indicate a probability of the input a3 being a boy, a child, a man, or a girl. Similarly, as discussed with respect to FIG. 4B, the output d3 of the model 106 is a probability vector Ps3=[ps3_1, ps3_2, ps3_3, ps3_4], where ps3_1, ps3_2, ps3_3, ps3_4 respectively indicate a probability of the input c3 being a boy, a child, a man, or a girl. When the model 106 is fully trained, the model 106 is to mimic the behavior of the model 104. Thus, when the model 106 is fully trained, ideally, the probability vector Ps3 should match the probability vector Pt3 beyond a threshold value. Similarly, when the model 106 is fully trained, ideally, the probability vector Ps2 should match the probability vector Pt2, the probability vector Ps4 should match the probability vector Pt4, and so on. Thus, when the model 106 is fully trained, ideally, each output dk of the model 106 should match a corresponding output bk of the model 104. For example, when the model 106 is fully trained, ideally, the output d0 should match the output b0, the output d2 should match the output b2, the output d3 should match the output b3, and so on (note that the outputs b1, d1 are not mentioned here, as these outputs correspond to the special token [START]).

In some embodiments, the loss function generation module 114 compares an output corresponding to a masked or unmasked token of the model 104 with a corresponding output of the masked or unmasked token of the model 106, to generate a corresponding loss function. For example, the loss function generation module 114 compares the output b3 for the unmasked token a3 from the model 104 with the corresponding output d3 the model 106, to generate a corresponding loss function L3. Put differently, the loss function L3 is based on a comparison of the probability vectors Pt3 and Ps3 from the models 104 and 106, respectively. Similarly, the loss function generation module 114 compares the output b4 for the unmasked token a4 from the model 104 with the corresponding output d4 the model 106, to generate a corresponding loss function L4. Similarly, the loss function generation module 114 compares the output b5 for the masked token a5 from the model 104 with the corresponding output d5 the model 106, to generate a corresponding loss function L5. Thus, loss functions L0, L1, ..., Lk, and so on are generated by the loss function generation module 114.

FIG. 5, merely as an example, also illustrates generation of the loss function L3. For example, the loss function generation module 114 receives the outputs b3 and d3 from the models 104, 106, respectively. The loss function generation module 114 generates a logit t3 of the probability vector Pt3 corresponding to the output b3, and generates a logit s3 of the probability vector Ps3 corresponding to the output d3.

For example, the probability vector Pt3 corresponding to the output b3 ranges from 0 to 1. The logit t3 maps this range [0,1] to a new range [−∞, +∞]. For example, in statistics, the logit function or the log-odds is the logarithm of the odds $p/(1-p)$, where p is a probability. For example, probability for output vector Pt3 for the output b3 is [pt3_1, pt3_2, pt3_3, pt3_4]. Thus, logit function is a logit value of each of pt3_1, pt3_2, pt3_3, pt3_4. Merely as an example, the logit function receives an input pt3_1, and outputs $pt3\_1/(1-pt3\_1)$, and thus maps the probability value pt3_1 from [0, 1] to (−∞, +∞).

Once the logit functions t3 and s3 are generated based respectively on b3 and d3, the loss function generation module 114 generates the example loss function L3 as follows:

$$L3=H(\sigma(t3/T),\sigma(s3/T)). \quad \text{Equation 1}$$

In equation 1, σ is the softmax function, t3 is the logit of the output b3 from the model 104, s3 is the logit of the output d3 from the model 106, T is a temperature hyperparameter of the models 104, 106, and the function H(.) is a cross-entropy function. Thus, in equation 1, the loss function generation module 114 compares cross-entropy between (i) a softmax of a normalized version of the logit t3 (e.g., normalized by T) and (ii) a softmax of a normalized version of the logit s3.

The loss functions L0, ..., Lk and so on, corresponding to the other output pairs (b0, d0), (b1, d1), and so on, are also determined in a similar manner. Once the loss functions L0, ..., Lk, and so on are determined, the loss function generation module 114 generates a total loss function (TLF) as:

$$\text{Total Loss Function (TLF)}=L0+L1+\ldots+Lk. \quad \text{Equation 2}$$

In equation 2, while generating the total loss function, the loss functions corresponding to the masked tokens and the loss functions corresponding to the unmasked tokens are equally weighted (along with an equal weight for the loss functions corresponding to the special tokens). However, in some other examples, the loss functions can be weighted differently. Merely as an example, the TLF can be:

$$\text{Total Loss Function (TLF)}=\Sigma\alpha i * Li, \text{ where } i=0, 1, \ldots, k, \quad \text{Equation 3}$$

where αi is a weighting function that weights individual loss functions. For example, the weighting function for loss functions corresponding to the special tokens may be zero (e.g., as there may not be any prediction for the special tokens). In another example, the weighing function for loss functions corresponding to the unmasked tokens may be αu, whereas the weighing function for loss functions corresponding to the masked tokens may be αm, where αu may be different from αm. Merely as an example, the masked tokens can be weighted higher than the masked tokens, as the models 104, 106 are unaware of the masked tokens, and the model 106 will eventually aim to predict masked tokens only during a regular operation after completion of training.

In some embodiments, the loss functions L0, ..., Lk and/or the Total Loss Function (TLF) are transmitted from the loss function generation module 114 to the parameter tuning module 120. The parameter tuning module 120 tunes the parameters of the student model 106, based on the loss functions L0, ..., Lk and/or the Total Loss Function (TLF).

For example, parameter tuning module 120 tunes the parameters of the student model 106, to minimize individual ones of the loss functions L0, ..., Lk and/or to minimize the Total Loss Function (TLF). Thus, the parameter tuning module 120 tunes the parameters of the student model 106, such that the model 106 mimics the behavior of the teacher model 104.

As the training progresses, the model 106 starts mimicking the model 104. For example, when the same training data 108 is input to both the models 104, 106, the tuning of the parameters of the model 106 results in the output of the model 106 to becoming increasingly similar to the output of the model 104. For example, an output of the model 106 for a specific set of training data 108 tends to be close to, or similar to, a corresponding output of the pre-trained teacher model 104. For example, as the training progresses, the output d3 of the model 106 tends to be close to, or similar to, the corresponding output b3 of the pre-trained teacher model 104. Put differently, as the training progresses, individual ones of the loss functions L0, ..., Lk decreases, and the overall TLF also decreases. After the model 106 is fully trained, ideally, the loss functions tend to zero, close to zero, or less than a threshold value (e.g., depending on how well trained the model 106 is).

Figure 6:
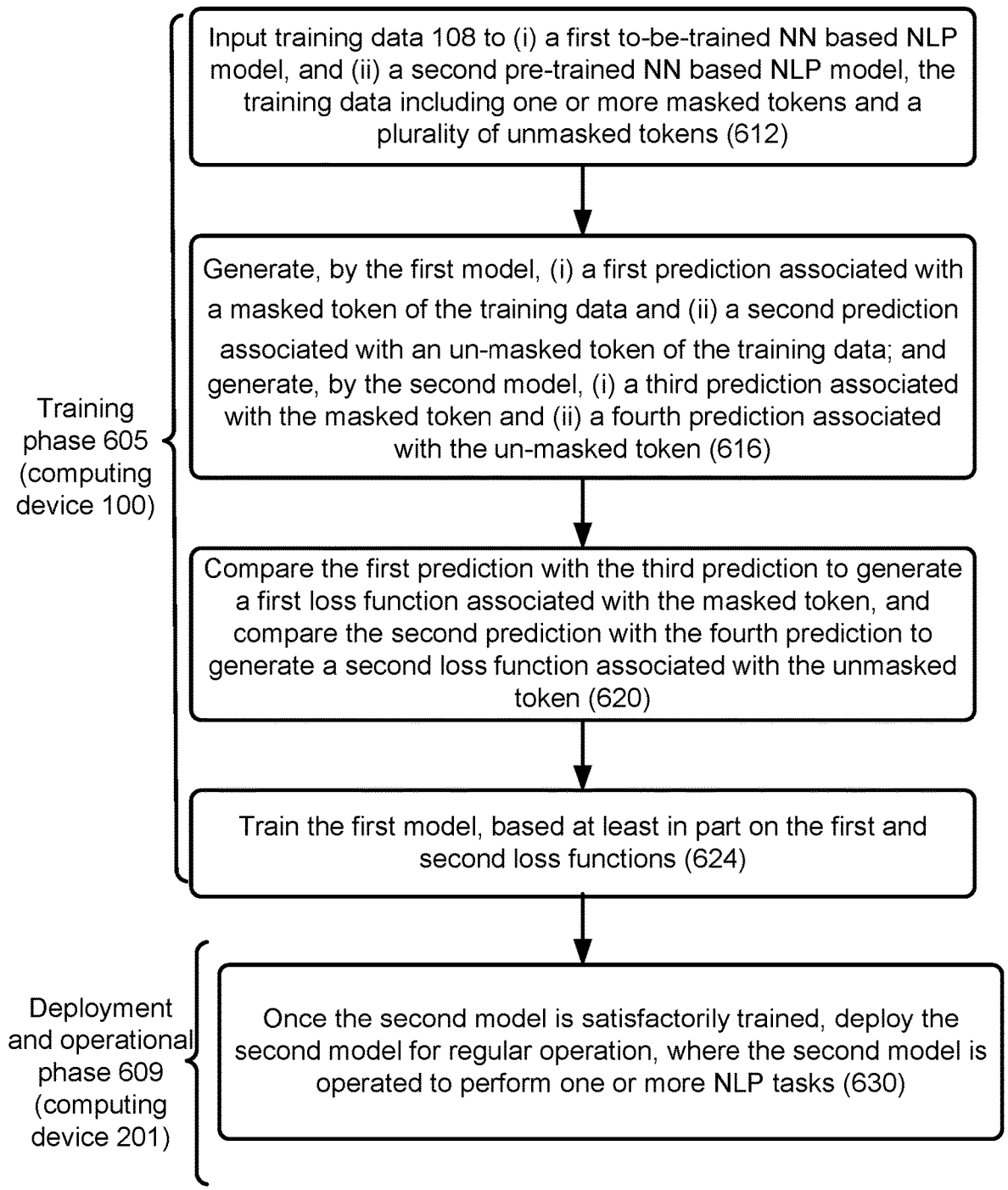
FIG. 6 is a flowchart illustrating an example method for training and operating a NN based NLP student model, where the student model is trained using a pre-trained NN based NLP teacher model, and where the training is based at least in part on predictions of masked and unmasked tokens of training data, in accordance with some embodiments of the present disclosure.

FIG. 6 is a flowchart illustrating an example method 600 for training and operating a first NN based NLP student model, where the first NN based NLP model is trained using a second pre-trained NN based NLP teacher model, and where the training is based on predictions of masked and unmasked tokens of training data, in accordance with some embodiments of the present disclosure. Method 600 (e.g., the training aspect of the method 600) can be implemented, for example, using the system architecture illustrated in FIGS. 1 and/or 2, and described herein, e.g., using the model training system 102 of the computing device 100. Method 600 (e.g., the deployment and operation aspect of the method 600) can be implemented, for example, using the system architecture illustrated in FIGS. 1 and/or 2, and described herein, e.g., using the computing device 201. However other system architectures can be used in other embodiments, as apparent in light of this disclosure. To this end, the correlation of the various functions shown in FIG. 6 to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system.

In an example, operations 612, 616, 620, and 624 of the method 600 are associated with training the first model, which is also referred to as a "training phase 605" of the method 600. In an example, the training phase 605 can be implemented at least in part by the model training system 102 of the computing device 100 of FIGS. 1 and 2.

In an example, operation 630 of the method 600 is associated with deployment and operation of the first model, which is also referred to as a "deployment and operational phase 609" of the method 600. In an example, the deployment and operational phase 609 can be implemented at least in part by the computing device 201 of FIG. 2.

In an example, the first NN based NLP student model is the model 106 discussed herein with respect to FIGS. 1-5. In an example, the second pre-trained NN based NLP teacher model is the model 104 discussed herein with respect to FIGS. 1-5.

At 612, the training data input module 103 of the model training system 102 inputs training data 108 to the first model and the second model. In an example, the same training data 108 is input to both the first and second models. In an example, the training data 108 includes one or more masked tokens, such as tokens corresponding to inputs a5 and a11 for the model 104 in FIG. 4A, and tokens corresponding to inputs c5 and c11 for the model 106 in FIG. 4B. In an example, the training data 108 further includes a plurality of unmasked tokens, such as tokens corresponding to inputs a2, a3, a4, a6, and so on for the model 104 in FIG. 4A, and tokens corresponding to inputs c2, c3, c4, c6 for the model 106 in FIG. 4B. The training data 108 further includes special character tokens, such as [START] and [SEP] discussed with respect to FIGS. 4A, 4B.

At 616, the first model generates (i) a first prediction associated with a masked token of the training data and (ii) a second prediction associated with an unmasked token of the training data. Merely as an example, the first prediction is the probability vector Ps5 associated with the masked token for the input c5 of the training data 108, and the second prediction is the probability vector Ps3 associated with the unmasked token for the input c3 of the training data 108, as discussed with respect to FIG. 4B.

Also, at 616, the second model generates (i) a third prediction associated with the masked token and (ii) a fourth prediction associated with the unmasked token. Merely as an example, the third prediction is the probability vector Pt5 associated with the masked token for the input a5 of the training data 108, and the second prediction is the probability vector Pt3 associated with the unmasked token for the input a3 of the training data 108, as discussed with respect to FIG. 4A.

At 620, the loss function generation module 114 compares the first prediction with the third prediction to generate a first loss function associated with the masked token, and compares the second prediction with the fourth prediction to generate a second loss function associated with the unmasked token. For example, FIG. 5 illustrates generation of the loss function L3 associated with an unmasked token, where the loss function generation module 114 generates the loss function L3 by comparing (i) the probability vector Pt3 of the output b3 of the model 104 and (ii) the probability vector Ps3 of the output d3 of the model 106. Generation of the loss function L3 is discussed in further detail with respect to equation 1 herein previously. The loss function L3 is associated with the unmasked token [boy] of the inputs a3 and c3 of the models 104 and 106, respectively. A loss function L5 can be similarly generated for the masked token of the inputs a5 and c5 of the models 104 and 106, respectively. Although not illustrated in FIG. 6, a total loss function can be generated, which is the sum of individual loss functions, e.g., as discussed herein previously with respect to equations 2 and 3.

At 624, the first model is trained, based at least in part on the first and second loss functions. For example, the parameter tuning module 120 receives the various loss functions, including the first and second loss functions, and tunes the parameters of the first model. The parameter tuning module 120 tunes the parameters with an aim of minimizing or reducing the loss functions. Once the loss functions are sufficiently small (e.g., less than a threshold), the training phase 605 of the method 600 completes, and the method 600 enters the deployment and operational phase 609.

Although not illustrated in FIG. 6, the comparison at 620 can also include generation and comparison of probability vectors associated with IsNext/NotNext predictions from the first and second models, and generation of associated loss function. Furthermore, although FIG. 6 illustrates merely a first loss function associated with a masked token, and a second loss function associated with an unmasked token, several such loss functions associated with multiple masked and unmasked tokens are generated and used to train the first model.

During the deployment and operational phase 609, the trained first model (e.g., as trained during the training phase 605) is deployed in an appropriate computing device, such as the computing device 201, for regular operation. For example, once deployed, the first model performs one or more NLP tasks, such as predicting masked tokens, predicting whether two sentences in a pair of sentences are adjacent sentence, and/or any other appropriate NLP tasks that the first model is configured to perform.

As discussed with respect to FIGS. 1-6, the model 106 is trained using loss functions that are derived based on both masked and unmasked tokens, as well as IsNext/NotNext predictions. For example, loss function L3 in FIG. 5 is based on an unmasked token, loss function L5 in FIG. 5 is based on a masked token, and loss function L0 in FIG. 5 is based on IsNext/NotNext prediction. Training the model 106 using predictions associated with both masked and unmasked tokens, as well as IsNext/NotNext predictions, results in generation of a higher number of loss functions, which results in a faster and better training of the model 106. Put differently, the model 106 is trained using (i) predictions associated with masked tokens, (ii) predictions associated with unmasked tokens, and (iii) IsNext/NotNext predictions, which results in a relatively larger number of loss functions. Accordingly, such training is also referred to herein as "dense knowledge distillation (KD)" training, or simply as "dense KD" training.

In contrast, if the training of the model 106 relies merely on predictions associated with masked tokens (and possibly also on IsNext/NotNext predictions), such training has to rely on relatively fewer number of loss functions—accordingly, such training is also referred to herein as "sparse knowledge distillation (KD)" training, or simply as "sparse KD" training.

Figure 7:
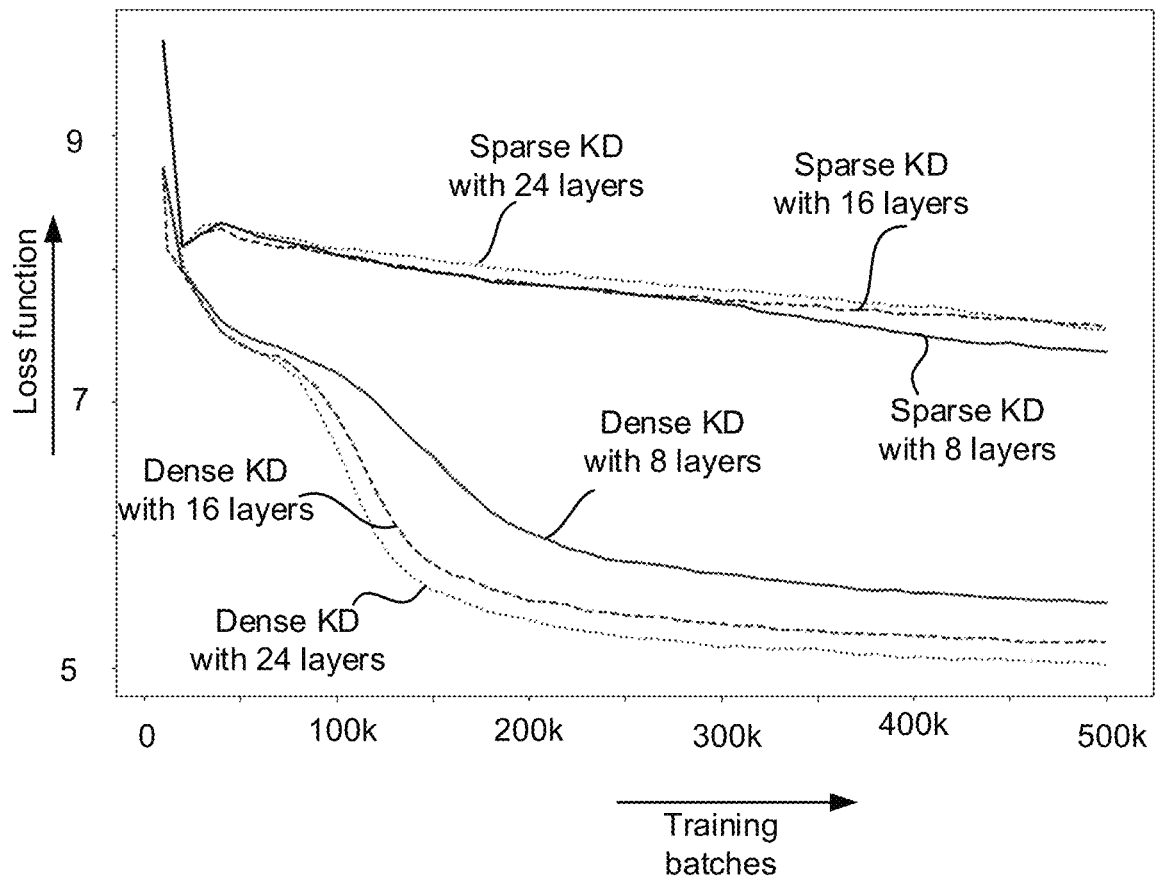
FIG. 7 illustrates a graph depicting convergence of loss function during sparse KD training and during dense KD training, in accordance with some embodiments of the present disclosure.

FIG. 7 illustrates a graph depicting convergence of loss functions during sparse KD training and during dense KD training, in accordance with some embodiments of the present disclosure. As discussed herein above, dense KD training refers to training the model 106 using loss functions associated with (i) predictions for masked tokens, (ii) predictions for unmasked tokens, and (iii) IsNext/NotNext predictions. FIGS. 1-6 discuss various examples and embodiments of the dense KD training. In contrast, sparse KD training refers to training the model 106 using loss functions associated with (i) predictions for masked tokens and (ii) IsNext/NotNext predictions.

In FIG. 7, the X axis represents a number of training batches used to train the student model 106, and the Y axis represents the loss function. Furthermore, three examples of the model 106 are considered: (i) a model with 8 transformer layers, (ii) a model with 16 transformer layers, and (i) a model with 24 transformer layers. As seen, for all three examples of the model 106, the dense KD training results in faster converge of the loss function, compared to the sparse KD training. This illustrates that, as discussed herein, the dense KD training helps in relatively faster and better training of the model 106, compared to the sparse KD training.

Numerous variations and configurations will be apparent in light of this disclosure and the following examples.

Example 1

A method for training a first neural network (NN) model using a pre-trained second neural network (NN) model, the method comprising: inputting training data to both the first NN model that is to be trained and the second NN model that is pre-trained, the training data including a plurality of masked tokens and a plurality of unmasked tokens; generating, by the first NN model, a first prediction and a second prediction, the first prediction associated with a masked token of the training data, and the second prediction associated with an unmasked token of the training data; generating, by the second NN model, a third prediction and a fourth prediction, the third prediction associated with the masked token, and the fourth prediction associated with the unmasked token; and training the first NN model, based at least in part on the first prediction, the second prediction, the third prediction, and the fourth prediction.

Example 2

The method of Example 1, wherein training the first NN model comprises: training the first NN model based at least in part on both (i) a comparison of the first prediction and the third prediction, and (ii) a comparison of the second prediction and the fourth prediction.

Example 3

The method of any of Examples 1-2, wherein training the first NN model comprises: generating a first loss function, based at least in part on a comparison of the first prediction and the third prediction; generating a second loss function, based at least in part on a comparison of the second prediction and the fourth prediction; and training the first NN model, based at least in part on the first loss function and the second loss function.

Example 4

The method of Example 3, wherein training the first NN model comprises: tuning one or more parameters of the first NN model, to reduce the first loss function and the second loss function.

Example 5

The method of any of Examples 3-4, wherein generating the first loss function comprises: generating a first logit for a first probability vector associated with the first prediction; generating a second logit for a second probability vector associated with the third prediction; and generating the first loss function to be a cross entropy between (i) a first function that is based at least in part on the first logit and (ii) a second function that is based at least in part on the second logit.

Example 6

The method of Example 5, wherein: the first function is a softmax of a ratio of the first logit and a temperature hyperparameter of the first NN model; and the second function is a softmax of a ratio of the second logit and the temperature hyperparameter of the first NN model.

Example 7

The method of any of Examples 1-6, wherein: the first prediction is in the form of a first probability vector comprising two or more corresponding probability values for two or more words, respectively, for the masked token; the second prediction is in the form of a second probability vector comprising two or more corresponding probability values for two or more words, respectively, for the unmasked token; the third prediction is in the form of a third probability vector comprising corresponding two or more probability values for two or more words, respectively, for the masked token; and the fourth prediction is in the form of a fourth probability vector comprising corresponding two or more probability values for two or more words, respectively, for the unmasked token.

Example 8

The method of any of Examples 1-7, wherein the training data comprises a pair of sentences comprising a first sentence and a second sentence, and wherein the method comprises: generating, by the first NN model, a first probability vector comprising (i) a first value indicating a first probability of the second sentence being logically adjacent to the first sentence, and (ii) a second value indicating a first probability of the second sentence not being logically adjacent to the first sentence; and generating, by the second NN model, a second probability vector comprising (i) a third value indicating a second probability of the second sentence being logically adjacent to the first sentence, and (ii) a fourth value indicating a second probability of the second sentence not being logically adjacent to the first sentence, wherein training the first NN model comprises training the first NN model, based at least in part on the first probability vector and the second probability vector.

Example 9

The method of Example 8, wherein training the first NN model comprises training the first NN model, based at least in part on a cross entropy between (i) a first function that is based at least in part on the first probability vector and (ii) a second function that is based at least in part on the second probability vector.

Example 10

A system for training a first neural network (NN) model using a pre-trained second neural network (NN) model, the system comprising: one or more processors; and a model training system executable by the one or more processors to input training data to the first model and the second model, the training data including masked and unmasked tokens; receive predictions associated with masked and unmasked tokens from each of the first and second models; and train the first model, based at least in part on the predictions associated with the masked and unmasked tokens from each of the first and second models.

Example 11

The system of Example 10, wherein to train the first model, the model training system is to: compare (i) a first function of a first prediction for an unmasked token from the first model and (ii) a second function of a second prediction for the unmasked token from the second model; compare (i) a third function of a third prediction for a masked token from the first model and (ii) a fourth function of a fourth prediction for the masked token from the second model; and train the first model, based at least in part on both (i) the comparison of the first function and the second function and (ii) the comparison of the third function and the fourth function.

Example 12

The system of any of Examples 10-11, wherein the training data has a first sentence and a second sentence, and wherein to train the first model, the model training system is to: receive, from each of the first and second models, predictions regarding whether the first sentence and the second sentence are adjacent sentences; and train the first model, based at least in part on the predictions regarding whether the first sentence and the second sentence are adjacent sentences.

Example 13

The system of any of Examples 10-12, further comprising: the first model and the second model executable by the one or more processors to generate the predictions associated with the masked and unmasked tokens of the training data.

Example 14

The system of any of Examples 10-13, wherein the first model and the second model are Natural Language Processing (NLP) models configured to perform one or more NLP tasks.

Example 15

The system of any of Examples 10-14, wherein: the first model has a first storage size that is substantially less than a second storage size of the second model; and a number of tunable parameters in the first model is substantially less than that in the second model.

Example 16

The system of any of Examples 10-15, wherein: each of the first model and the second model is a corresponding one of a GPT (generative pre-training) model, OpenAI GPT-2 model, BERT (Bidirectional Encoder Representations from Transformers) model, ELMo (Embeddings from Language Model) model, or BiLSTM (bidirectional long short-term memory network) model.

Example 17

The system of Example 16, wherein: the first model is of a different type than the second model.

Example 18

A computer program product including one or more non-transitory machine-readable mediums encoded with instructions that when executed by one or more processors cause a process to be carried out for training a Neural Network (NN) based Natural Language Processing (NLP) student model using a NN based NLP teacher model, the process comprising: receiving, from each of the teacher and student models, (i) one or more predictions associated with masked tokens of training data, (ii) one or more predictions associated with unmasked tokens of the training data, and (iii) one or more predictions associated with whether two sentences of the training data are adjacent sentences; and training the student model, based at least in part on one or more of the one or more predictions received from the teacher and student models.

Example 19

The computer program product of Example 18, wherein the process further comprises: generating a first loss function based at least in part on predictions, from each of the teacher and student models, associated with a masked token; generating a second loss function based at least in part on predictions, from each of the teacher and student models, associated with an unmasked token; and generating a third loss function based at least in part on predictions, from each of the teacher and student models, associated with whether the two sentences are adjacent sentences; wherein training the student model comprises training the student model based at least in part on the first, second, and third loss functions.

Example 20

The computer program product of Example 19, wherein the computer program product is part of an application that includes an intelligent assistant, and the intelligent assistant uses the student model to understand user queries.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for training a first neural network (NN) model using a pre-trained second neural network (NN) model, the method comprising:
    inputting training data to both the first NN model that is to be trained and the second NN model that is pre-trained, the training data including a plurality of masked tokens and a plurality of unmasked tokens;
    generating, by the first NN model, a first prediction and a second prediction, the first prediction associated with a masked token of the training data, and the second prediction associated with an unmasked token of the training data;
    generating, by the second NN model, a third prediction and a fourth prediction, the third prediction associated with the masked token, and the fourth prediction associated with the unmasked token; and
    training the first NN model, based at least in part on the first prediction, the second prediction, the third prediction, and the fourth prediction.

2. The method of claim 1, wherein training the first NN model comprises: training the first NN model based at least in part on both (i) a comparison of the first prediction and the third prediction, and (ii) a comparison of the second prediction and the fourth prediction.

3. The method of claim 1, wherein training the first NN model comprises:
    generating a first loss function, based at least in part on a comparison of the first prediction and the third prediction;
    generating a second loss function, based at least in part on a comparison of the second prediction and the fourth prediction; and
    training the first NN model, based at least in part on the first loss function and the second loss function.

4. The method of claim 3, wherein training the first NN model comprises: tuning one or more parameters of the first NN model, to reduce the first loss function and the second loss function.

5. The method of claim 3, wherein generating the first loss function comprises:
    generating a first logit for a first probability vector associated with the first prediction;
    generating a second logit for a second probability vector associated with the third prediction; and
    generating the first loss function to be a cross entropy between (i) a first function that is based at least in part on the first logit and (ii) a second function that is based at least in part on the second logit.

6. The method of claim 5, wherein:
    the first function is a softmax of a ratio of the first logit and a temperature hyperparameter of the first NN model; and
    the second function is a softmax of a ratio of the second logit and the temperature hyperparameter of the first NN model.

7. The method of claim 1, wherein:
    the first prediction is in the form of a first probability vector comprising two or more corresponding probability values for two or more words, respectively, for the masked token;
    the second prediction is in the form of a second probability vector comprising two or more corresponding probability values for two or more words, respectively, for the unmasked token;
    the third prediction is in the form of a third probability vector comprising corresponding two or more probability values for two or more words, respectively, for the masked token; and
    the fourth prediction is in the form of a fourth probability vector comprising corresponding two or more probability values for two or more words, respectively, for the unmasked token.

8. The method of claim 1, wherein the training data comprises a pair of sentences comprising a first sentence and a second sentence, and wherein the method comprises:
    generating, by the first NN model, a first probability vector comprising (i) a first value indicating a first probability of the second sentence being logically adjacent to the first sentence, and (ii) a second value indicating a first probability of the second sentence not being logically adjacent to the first sentence; and
    generating, by the second NN model, a second probability vector comprising (i) a third value indicating a second probability of the second sentence being logically adjacent to the first sentence, and (ii) a fourth value indicating a second probability of the second sentence not being logically adjacent to the first sentence,
    wherein training the first NN model comprises training the first NN model, based at least in part on the first probability vector and the second probability vector.

9. The method of claim 8, wherein training the first NN model comprises training the first NN model, based at least in part on a cross entropy between (i) a first function that is based at least in part on the first probability vector and (ii) a second function that is based at least in part on the second probability vector.

10. A system for training a first neural network (NN) model using a pre-trained second neural network (NN) model, the system comprising:
    one or more processors; and
    a model training system executable by the one or more processors to
        input training data to the first model and the second model, the training data including masked and unmasked tokens;
        receive predictions associated with masked and unmasked tokens from each of the first and second models; and
        train the first model, based at least in part on the predictions associated with the masked and unmasked tokens from each of the first and second models.

11. The system of claim 10, wherein to train the first model, the model training system is to:
    compare (i) a first function of a first prediction for an unmasked token from the first model and (ii) a second function of a second prediction for the unmasked token from the second model;

compare (i) a third function of a third prediction for a masked token from the first model and (ii) a fourth function of a fourth prediction for the masked token from the second model; and train the first model, based at least in part on both (i) the comparison of the first function and the second function and (ii) the comparison of the third function and the fourth function.

12. The system of claim 10, wherein the training data has a first sentence and a second sentence, and wherein to train the first model, the model training system is to:

receive, from each of the first and second models, predictions regarding whether the first sentence and the second sentence are adjacent sentences; and train the first model, based at least in part on the predictions regarding whether the first sentence and the second sentence are adjacent sentences.

13. The system of claim 10, further comprising: the first model and the second model executable by the one or more processors to generate the predictions associated with the masked and unmasked tokens of the training data.

14. The system of claim 10, wherein the first model and the second model are Natural Language Processing (NLP) models configured to perform one or more NLP tasks.

15. The system of claim 10, wherein:

the first model has a first storage size that is less than a second storage size of the second model; and a number of tunable parameters in the first model is less than that in the second model.

16. The system of claim 10, wherein: each of the first model and the second model is a corresponding one of a GPT (generative pre-training) model, OpenAI GPT-2 model, BERT (Bidirectional Encoder Representations from Transformers) model, ELMo (Embeddings from Language Model) model, or BiLSTM (bidirectional long short-term memory network) model.

17. The system of claim 16, wherein: the first model is of a different type than the second model.

18. A computer program product including one or more non-transitory machine-readable mediums encoded with instructions that when executed by one or more processors cause a process to be carried out for training a Neural Network (NN) based Natural Language Processing (NLP) student model using a NN based NLP teacher model, the process comprising:

receiving, from each of the teacher and student models, (i) one or more predictions associated with masked tokens of training data, (ii) one or more predictions associated with unmasked tokens of the training data, and (iii) one or more predictions associated with whether two sentences of the training data are adjacent sentences; and training the student model, based at least in part on one or more of the one or more predictions received from the teacher and student models.

19. The computer program product of claim 18, wherein the process further comprises:

generating a first loss function based at least in part on predictions, from each of the teacher and student models, associated with a masked token;

generating a second loss function based at least in part on predictions, from each of the teacher and student models, associated with an unmasked token; and generating a third loss function based at least in part on predictions, from each of the teacher and student models, associated with whether the two sentences are adjacent sentences;

wherein training the student model comprises training the student model based at least in part on the first, second, and third loss functions.

20. The computer program product of claim 19, wherein the computer program product is part of an application that includes an intelligent assistant, and the intelligent assistant uses the student model to understand user queries.

* * * * *